US012330413B2

(12) United States Patent
Mukaida

(10) Patent No.: US 12,330,413 B2
(45) Date of Patent: Jun. 17, 2025

(54) TRANSPORT DEVICE AND PRINTING DEVICE

(71) Applicant: Seiko Epson Corporation, Tokyo (JP)

(72) Inventor: Atsushi Mukaida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

(21) Appl. No.: 17/558,733

(22) Filed: Dec. 22, 2021

(65) Prior Publication Data

US 2022/0194100 A1 Jun. 23, 2022

(30) Foreign Application Priority Data

Dec. 23, 2020 (JP) ................................ 2020-214116

(51) Int. Cl.

| | |
|---|---|
| ***B65H 5/38*** | (2006.01) |
| ***B41J 11/00*** | (2006.01) |
| ***B65H 5/36*** | (2006.01) |
| ***B65H 29/52*** | (2006.01) |
| ***B65H 29/60*** | (2006.01) |
| ***B65H 43/00*** | (2006.01) |
| ***G03G 21/00*** | (2006.01) |

(52) U.S. Cl.
CPC .......... *B41J 11/0045* (2013.01); *B65H 29/60* (2013.01); *B65H 43/00* (2013.01); *B65H 2511/12* (2013.01)

(58) Field of Classification Search
CPC ...... B65H 5/38; B65H 5/36; B65H 2601/321; B65H 2601/324; B65H 2402/45; B65H 2402/441; B65H 29/60; B65H 43/00; G03G 21/1623; G03G 21/1633; B41J 11/0045
See application file for complete search history.

(56) References Cited

U.S. PATENT DOCUMENTS

2013/0071166 A1* 3/2013 Mori .................. G03G 15/6573 399/364
2018/0150021 A1* 5/2018 Yamamoto ......... G03G 21/1609
2019/0009563 A1 1/2019 Tokisawa et al.
2020/0346468 A1 11/2020 Tokisawa et al.
2022/0194084 A1* 6/2022 Nakahata ............. B41J 13/0018

FOREIGN PATENT DOCUMENTS

JP 2019-014253 1/2019

* cited by examiner

*Primary Examiner* — Luis A Gonzalez
(74) *Attorney, Agent, or Firm* — WORKMAN NYDEGGER

(57) ABSTRACT

A transport portion includes a device main body, an upper guide portion, and a lower guide portion. In the device main body, a descending path and an ascending path overlap each other in a Z direction. The upper guide portion is configured to be moved outward with respect to the device main body and is positioned above the descending path and the ascending path in a state in which the upper guide portion is stored. The lower guide portion forms the descending path and the ascending path together with the upper guide portion. The lower guide portion includes a first path forming member and a second path forming member. The first path forming member forms the descending path and at least partially overlaps a moving area of the upper guide portion at a first position and does not overlap the moving area at a second position.

11 Claims, 11 Drawing Sheets

TRANSPORT DEVICE AND PRINTING DEVICE

The present application is based on, and claims priority from JP Application Serial Number 2020-214116, filed Dec. 23, 2020, the disclosure of which is hereby incorporated by reference herein in its entirety.

BACKGROUND

1. Technical Field

The present disclosure relates to a transport device and a printing device.

2. Related Art

In an ink jet recording device of JP-A-2019-14253, a transport path through which a recording medium ascends from an upstream transport roller to a downstream transport roller in a transport direction is shown.

In the ink jet recording device of JP-A-2019-14253, a configuration in which a descending path and an ascending path are provided in parts of the transport path so that parts of the transport path overlap each other in a height direction of the ink jet recording device is conceivable as a configuration in which a length of the transport path is increased without increasing a size of the ink jet recording device. The transport path is composed of an inner member remaining in a device main body and an outer member that can be opened/closed with respect to the device main body.

However, in this configuration, since the descending path and the ascending path exist in a part of the transport path, when the transport path is opened, there is a risk that a member positioned outside the device main body and a member positioned inside the device main body will interfere with each other and therefore the transport path cannot be opened.

Further, in this configuration, when an attempt is made to open the transport path after taking out parts constituting the descending path and the ascending path, there is a risk that an extra space for taking out the parts constituting the descending path and the ascending path will be required for the device main body and therefore a size of the ink jet recording device will increase.

SUMMARY

According to an aspect of the present disclosure, a transport device includes: a device main body provided with a transport path in which a descending path, through which a medium is transported downward in a device height direction, and an ascending path, through which the medium is transported upward in the device height direction, overlap in the device height direction; an upper guide portion configured to be moved outward with respect to the device main body and positioned above the descending path and the ascending path in the device height direction in a state in which the upper guide portion is stored in the device main body; and a lower guide portion provided in the device main body, positioned below the upper guide portion in the device height direction, and forming the descending path and the ascending path together with the upper guide portion, in which the lower guide portion includes a first path forming member forming the descending path and a second path forming member disposed downstream of the first path forming member in a transport direction of the medium and forming the ascending path, and the first path forming member is configured to be moved to a first position and a second position, forms the descending path and at least partially overlaps a moving area of the upper guide portion in the device height direction at the first position, and does not overlap the moving area in the device height direction at the second position.

DESCRIPTION OF EXEMPLARY EMBODIMENTS

Figure 1:
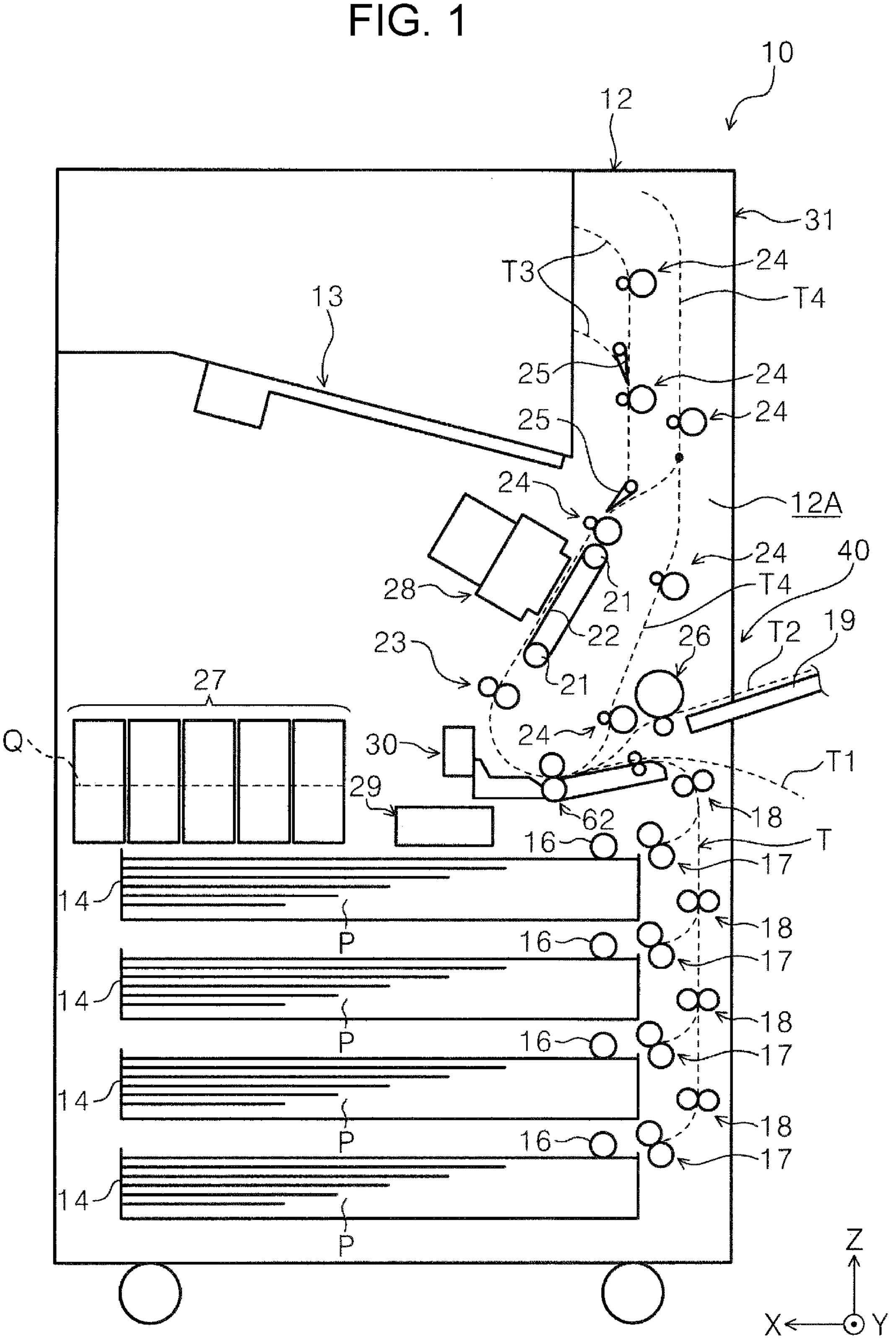
FIG. 1 is a view illustrating a transport path of paper of a printer according to an embodiment.

Hereinafter, the present disclosure will be schematically described.

A transport device according to a first aspect includes: a device main body provided with a transport path in which a descending path, through which a medium is transported downward in a device height direction, and an ascending path, through which the medium is transported upward in the device height direction, overlap in the device height direction; an upper guide portion configured to be moved outward with respect to the device main body and positioned above the descending path and the ascending path in the device height direction in a state in which the upper guide portion is stored in the device main body; and a lower guide portion provided in the device main body, positioned below the upper guide portion in the device height direction, and forming the descending path and the ascending path together with the upper guide portion, in which the lower guide portion includes a first path forming member forming the descending path and a second path forming member disposed downstream of the first path forming member in a transport direction of the medium and forming the ascending path, and the first path forming member is configured to be moved to a first position and a second position, forms the descending path and at least partially overlaps a moving area of the upper guide portion in the device height direction at the first position, and does not overlap the moving area in the device height direction at the second position.

According to the present aspect, by having the ascending path and the descending path, it is possible to make a path length of the transport path larger than that of a configuration having a linear transport path.

In addition, the first path forming member is moved to the second position, such that the upper guide portion can be moved outward with respect to the device main body and the transport path is opened, and thus, it is possible to facilitate maintenance of the second path forming member.

Further, when the upper guide portion is moved outward with respect to the device main body, only the first path forming member needs to be retracted in the lower guide portion, and thus, it is possible to minimize a space for the lower guide portion to retract.

The transport device according to a second aspect, in the first aspect, further includes a shaft portion supporting the first path forming member so as to allow rotation of the first path forming member to one of the first position and the second position is provided, and the shaft portion is positioned below a coupling position between the descending path and the ascending path in the device height direction and below the moving area.

According to the present aspect, the first path forming member is rotated around the shaft portion to be moved to one of the first position and the second position, and thus, it is possible to move the first path forming member with a simple configuration. In addition, the shaft portion is positioned below the moving area of the upper guide portion, and thus, it is possible to prevent the shaft portion from coming into contact with the upper guide portion.

In the transport device according to a third aspect, in the second aspect, the second path forming member is configured to be attached to and detached from a portion of the first path forming member to which the shaft portion is attached.

According to the present aspect, the second path forming member can be attached and detached without detaching the first path forming member, and thus, it is possible to facilitate a work of replacement or maintenance of the second path forming member. In addition, the second path forming member is attached and detached from the first path forming member, and thus, it becomes easy to secure position accuracy of the second path forming member with respect to the first path forming member as compared with a configuration in which the second path forming member is attached to and detached from a portion different from the first path forming member.

In the transport device according to a fourth aspect, in the third aspect, the second path forming member is mounted at the first path forming member and configured to rotate around the shaft portion and is configured to be moved to a facing position where the second path forming member faces the upper guide portion and a retract position above the facing position in the device height direction in a state in which the second path forming member is mounted at the first path forming member, and when the upper guide portion is positioned outside the device main body, the second path forming member is configured to be attached to and detached from the first path forming member at the retract position.

According to the present aspect, the upper guide portion retracts, such that an opened space can be used, and thus, it is possible to facilitate a work of attaching and detaching the second path forming member.

In the transport device according to a fifth aspect, in the third or fourth aspect, the second path forming member is provided with an engaging portion engaging with the first path forming member, the first path forming member is provided with an engaged portion engaged with the engaging portion, the engaging portion has an opening that opens in a radial direction of the shaft portion, and the engaged portion has an anisotropic shape in which the engaged portion is configured to pass through the opening when the second path forming member is in the retract position and is configured not to pass through the opening when the second path forming member is in the facing position.

According to the present aspect, when the second path forming member is in the facing position, the second path forming member is not detached from the first path forming member In other words, when the medium is transported along the transport path, a positional deviation of the second path forming member with respect to the first path forming member is suppressed, and thus, it is possible to stabilize a transport state of the medium in the ascending path.

In the transport device according to a sixth aspect, in any one of the first to fifth aspects, the device main body includes a sensor unit configured to detect the medium and to be attached to and detached from the device main body, and the sensor unit faces the ascending path downstream of the second path forming member in the transport direction and is configured to be detached from the device main body by the second path forming member being detached.

According to the present aspect, attachment and detachment and maintenance of the sensor unit become possible by detaching the second path forming member, and thus, it is possible to facilitate the attachment and detachment and the maintenance of the sensor unit as compared with a configuration in which maintenance of the sensor unit becomes possible by detaching all of the lower guide portions.

In the transport device according to a seventh aspect, in the sixth aspect, the second path forming member is attached to the sensor unit in a state in which the second path forming member is positioned at the facing position.

According to the present aspect, it is possible to secure position accuracy of the second path forming member with respect to the sensor unit.

In the transport device according to an eighth aspect, in any one of the first to seventh aspects, the second path forming member includes a widened portion expanding a space of the ascending path in an intersecting direction intersecting both of a width direction of the medium and the transport direction, and a guide portion guiding the medium along the ascending path, and the guide portion is configured to be displaced to a protrusion position where the guide portion protrudes toward the ascending path and a storage position where the guide portion is stored in the second path forming member.

According to the present aspect, when the medium is transported in the ascending path, the guide portion is disposed at the protrusion position, such that the ascending path is formed.

Meanwhile, for example, when the medium is deflected in the ascending path in order to perform skew correction or the like of the medium, the guide portion is displaced to the storage position, such that a space of the ascending path is expanded to the widened portion. As a result, a space for deflecting the medium can be secured. As described above, the space of the ascending path can be used properly depending on a purpose.

A printing device according to a ninth aspect includes: the transport device according to any one of the first to eighth aspects; and a recording portion performing recording on the medium transported by the transport device.

According to the present aspect, the action and effect described in any one of the first to eighth aspects can be obtained.

Hereinafter, a transport portion 40 as an example of a transport device and a printer 10 as an example of a printing device according to the present disclosure will be specifically described.

As illustrated in FIG. 1, the printer 10 is configured as an ink jet device that performs recording by ejecting ink Q, which is an example of a liquid, onto paper P as an example of a medium. Note that an XYZ coordinate system represented in each drawing is a Cartesian coordinate system.

An X direction is a device width direction when viewed from an operator of the printer 10, and is a horizontal direction. In the X direction, a direction toward the left is a +X direction, and a direction to the right is a −X direction.

A Y direction is a width direction and a device depth direction intersecting a transport direction of the paper P, and is a horizontal direction. In the Y direction, a direction toward the front is a +Y direction, and a direction toward the back is a −Y direction.

A Z direction is an example of a device height direction, and is a vertical direction. In the Z direction, an upward direction is a +Z direction, and a downward direction is a −Z direction. In the present embodiment, the "upward direction" refers to a direction including an upper component in the Z direction. The "downward direction" refers to a direction including a lower component in the Z direction.

In the printer 10, the paper P is transported through a transport path T represented by broken lines. Note that the transport direction in which the paper P is transported is a direction along the transport path T, and thus, differs in each part of the transport path T.

The printer 10 includes a device main body 12, a cover portion 31, a transport portion 40 to be described later, and a line head 28.

The device main body 12 includes a housing that serves as an outer shell. A discharge portion 13 including a space to which the recorded paper P is discharged is formed in the +Z direction with respect to the center of the device main body 12 in the Z direction. In addition, the device main body 12 is provided with a plurality of paper cassettes 14. Note that an opening 12A that opens in the X direction is formed at an end portion of the device main body 12 in the −X direction. In an opened state of the opening 12A, a transport path T to be described later is exposed. A part of the device main body 12 is also used as a device main body of a transport portion 40 to be described later, as an example.

Figure 3:
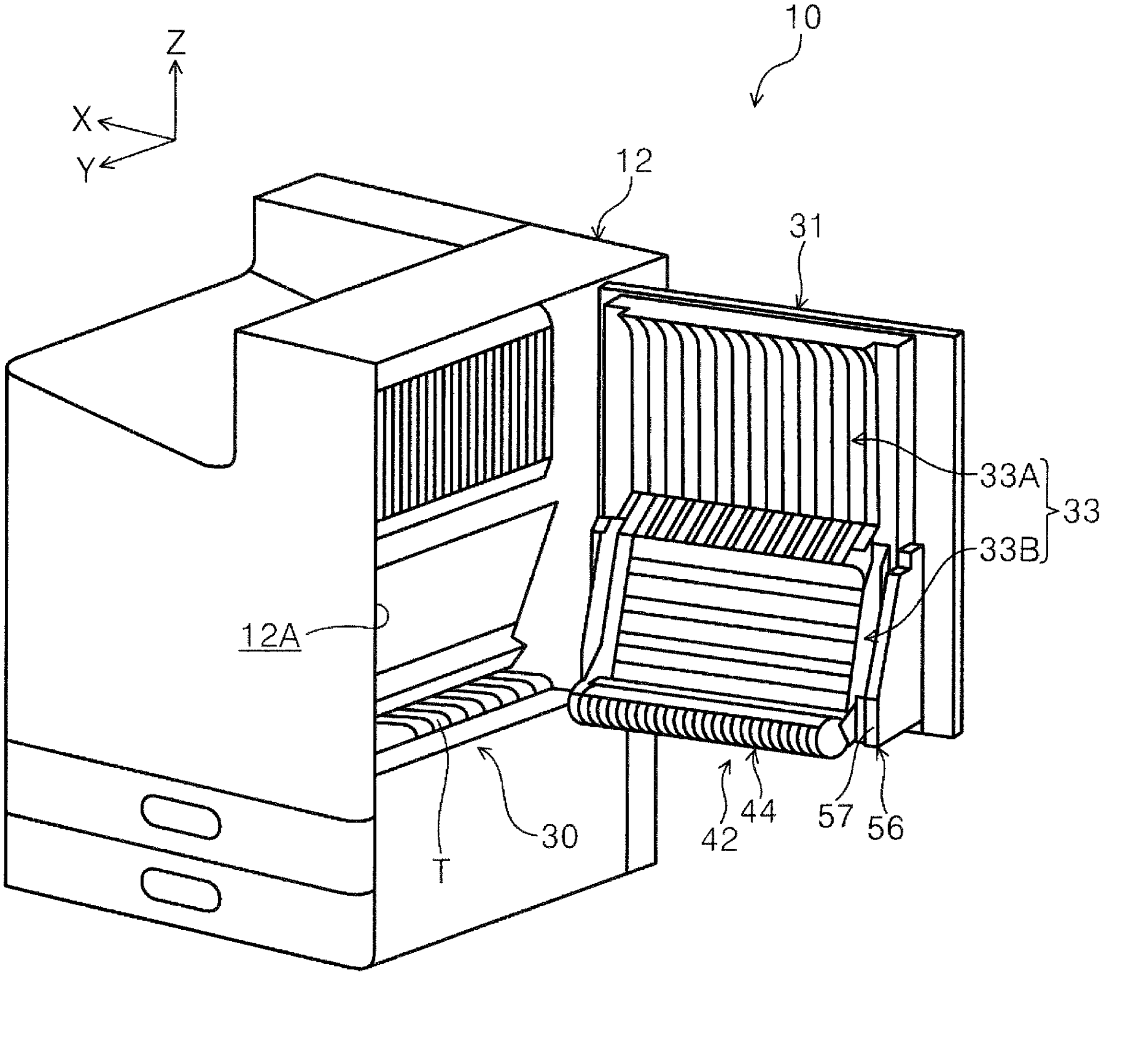
FIG. 3 is a perspective view illustrating a state in which the transport path of the printer according to the embodiment is opened.

As illustrated in FIG. 3, the cover portion 31 is formed in a plate shape having a predetermined thickness. The cover portion 31 is provided at an end portion of the device main body 12 in the −X direction via a hinge portion (not illustrated) positioned at an end portion of the opening 12A in the −Y direction. As a result, the cover portion 31 can rotate around an axis (not illustrated) along the Z direction.

The cover portion 31 can open/close the transport path T by opening or closing the opening 12A in accordance with the rotation. In other words, the cover portion 31 is rotatable between an opened position where it exposes the transport path T and a closed position where it hides the transport path T. Further, the cover portion 31 is attached with a reversing path forming member 33 and an upper guide portion 42 to be described later, as an example.

The reversing path forming member 33 includes an upper portion 33A forming a portion above the center of a reversing path T4 (FIG. 1) in the Z direction and a lower portion 33B including a portion below the center of the reversing path T4 in the Z direction. The upper guide portion 42 is attached to the lower portion 33B.

As illustrated in FIG. 1, the paper P is stored in the plurality of paper cassettes 14. The paper P stored in the paper cassette 14 is transported along the transport path T by a pick roller 16 and transport roller pairs 17 and 18. A transport path T1 through which the paper P is transported from an external device (not illustrated) and a transport path T2 through which the paper P is transported from a manual feed tray 19 provided in the device main body 12 via a feed roller pair 26 merge into the transport path T.

A portion of the printer 10 in the −X direction with respect to the center of the printer 10 in the X direction is configured as the transport portion 40 as an example of a transport device that transports the paper P. Details of the transport portion 40 will be described later. A main body of the transport portion 40 is also used as the device main body 12, as an example.

In the transport path T, two pulleys 21, a transport belt 22 wound around the two pulleys 21, a skew roller pair 23 performing skew correction or the like of the paper P, a plurality of transport roller pairs 24 transporting the paper P, a plurality of flaps 25 switching the path through which the paper P is transported, and a medium width sensor 30 to be described later are disposed. A transport path T3 toward the discharge portion 13 and the reversing path 14 for reversing the front and the rear of the paper P are provided downstream of the transport belt 22 in the transport path T.

Figure 2:
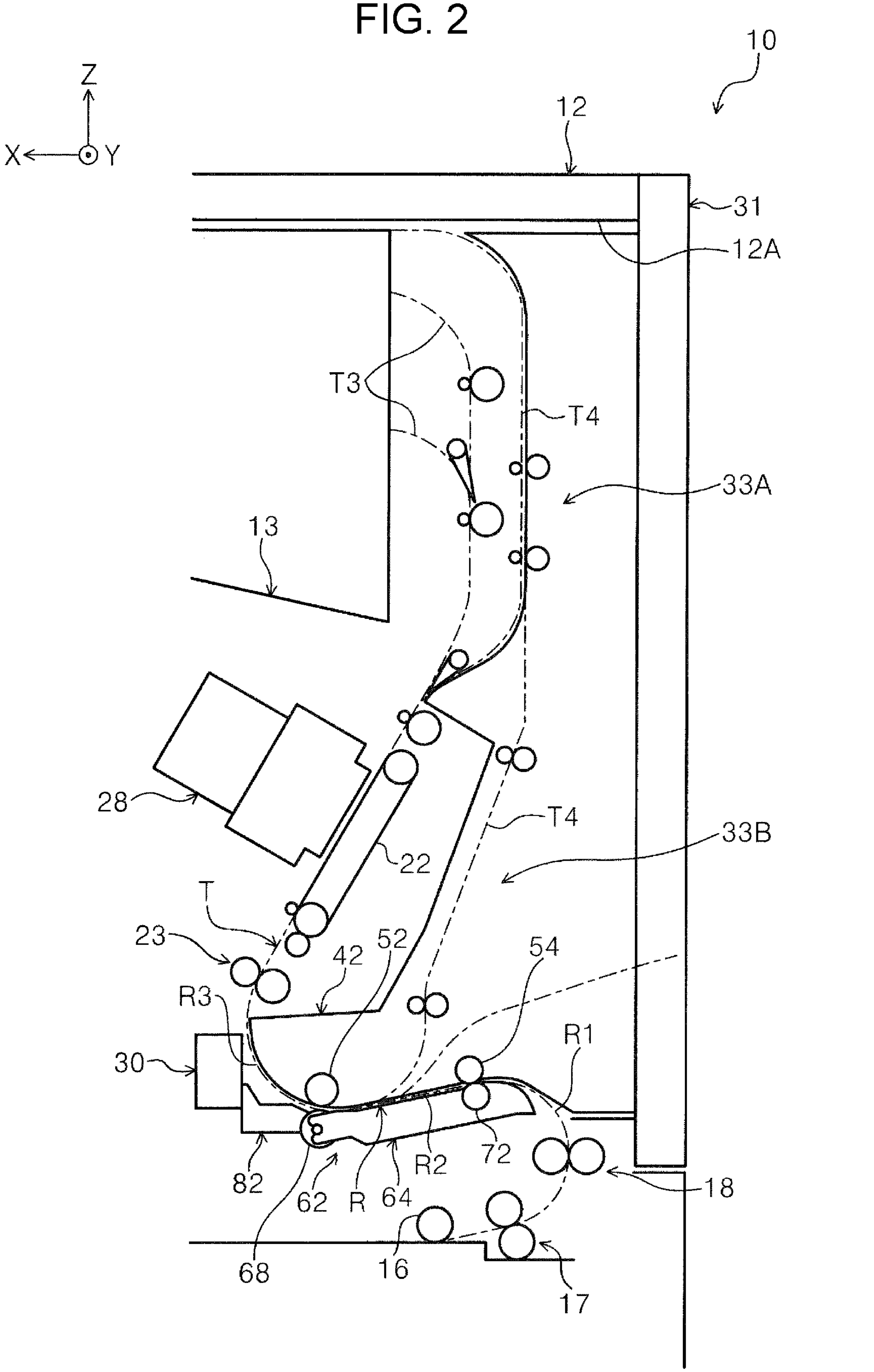
FIG. 2 is a schematic view of the transport path of the paper of the printer according to the embodiment.
Figure 4:
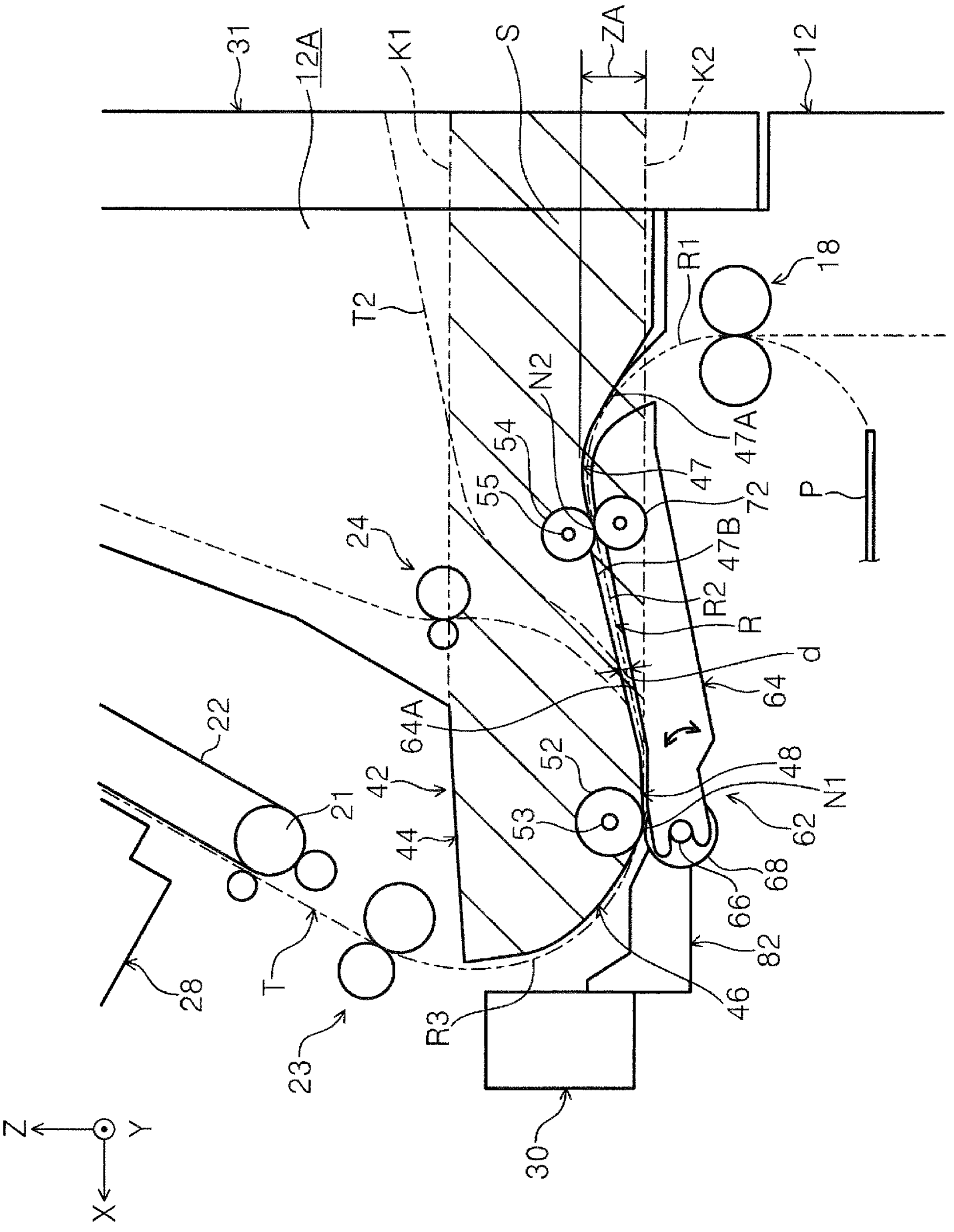
FIG. 4 is enlarged schematic view of a part of a transport path of a transport portion according to the embodiment.

As illustrated in FIGS. 2 and 4, the medium width sensor 30 is an example of a sensor unit capable of detecting the paper P. The medium width sensor 30 is provided to be attachable to and detachable from a frame (not illustrated) of the device main body 12. As a method of making the medium width sensor 30 attachable to and detachable from the frame, a known attachment and detachment method such as snap fit can be used. Note that in the present embodiment, attachment and detachment are performed using screws (not illustrated) from the viewpoint of ensuring detection accuracy.

As an example, the medium width sensor 30 is disposed in the +X direction with respect to an ascending path R3 to be described later, and faces the paper P that is moving along the ascending path R3 with an interval therebetween. In addition, the medium width sensor 30 faces the ascending path R3 downstream of a second path forming member 82 to be described later in a transport direction of the paper P, and can be detached from the device main body 12 by detaching the second path forming member 82.

Figure 5:
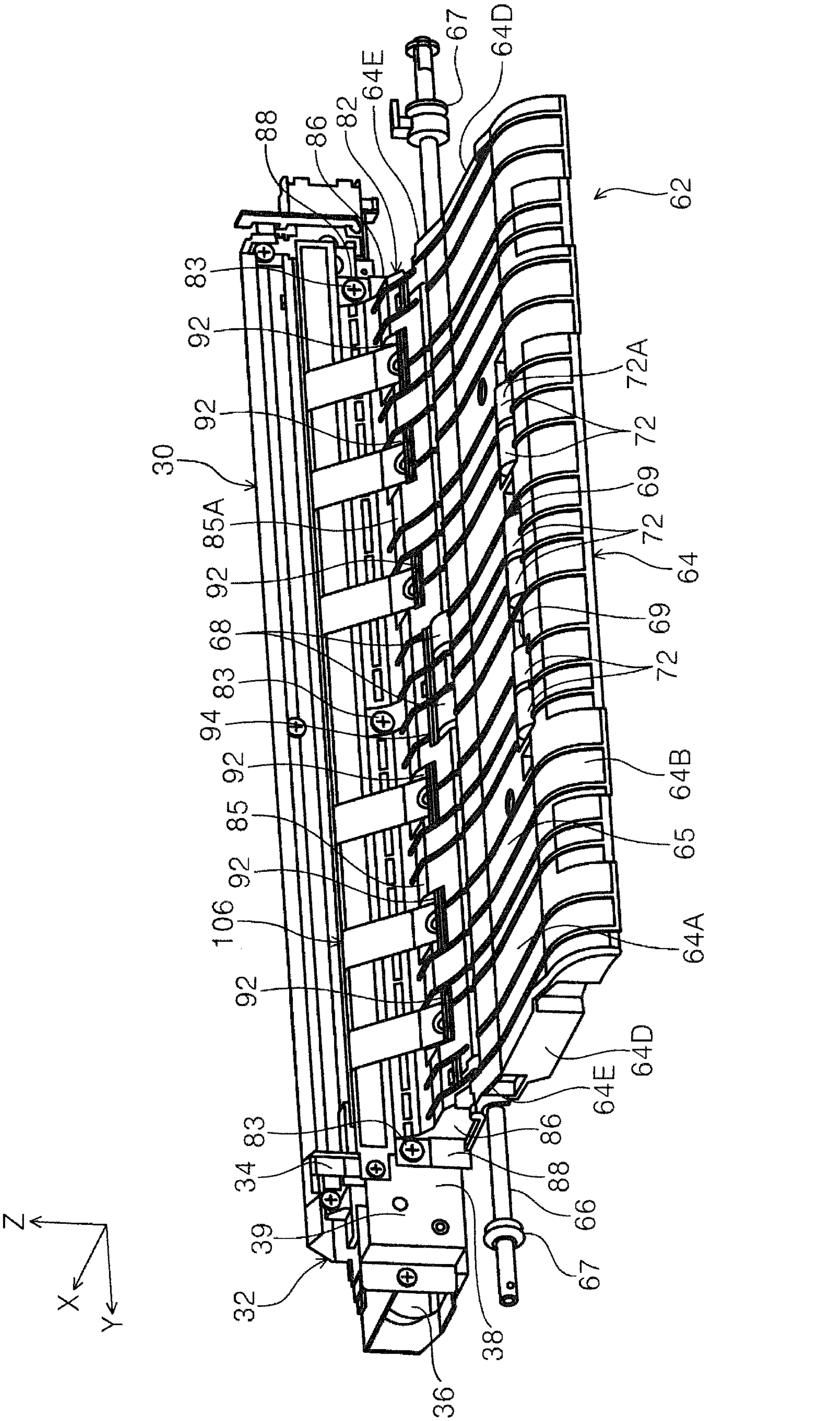
FIG. 5 is a perspective view illustrating a first path forming member, a second path forming member, and a paper width sensor according to the embodiment.

As illustrated in FIG. 5, the medium width sensor 30 includes a main body portion 32 extending in the Y direction, a detection portion 34 provided to be movable in the Y direction in the main body portion 32, and a motor 36 moving the detection portion 34 in the Y direction, as an example. The medium width sensor 30 can detect a width of the paper P in the Y direction by detecting the presence or absence of the paper P while the detection portion 34 is moved in the Y direction. As a detection method, for example, there is an optical method that detects the width of the paper P in the Y direction by the presence or absence of reception of reflected light.

A side wall 38 is provided at an end portion of the main body portion 32 in the −X direction. A side surface 39 of the side wall 38 in the −X direction is a plane along a Y-Z plane, as an example.

As illustrated in FIG. 2, in the transport path T, a curved path R is formed upstream of the medium width sensor 30.

The curved path R is formed as a path having a set of peak and valley. Specifically, the curved path R includes an introduction path R1 that curves from the transport roller pair 18 toward a position in the +X direction and the +Z direction, a descending path R2 that curves while descending from an end portion of the introduction path R1 in the +X direction toward a position in the +X direction and the −Z direction, and an ascending path R3 that curves while ascending from an end portion of the descending path R2 in the +X direction toward the +X direction and the +Z direction.

As illustrated in FIG. 1, the device main body 12 is provided with an ink tank 27 for accommodating the ink Q, the line head 28, and a control portion 29 controlling operations of each portion of the printer 10.

The line head 28 is positioned downstream of the medium width sensor 30 in the transport direction of the paper P. In addition, the line head 28 is an example of a recording portion, and performs recording by ejecting the ink Q supplied from the ink tank 27 onto the paper P transported by the transport portion 40.

The control portion 29 includes a central processing unit (CPU), a read only memory (ROM), a random access memory (RAM), and a storage that are not illustrated, and controls the transport of the paper P in the printer 10 or operations of each portion including the line head 28 and the transport portion 40.

As illustrated in FIG. 4, the transport portion 40 includes the device main body 12, the upper guide portion 42, and a lower guide portion 62, as an example.

In the device main body 12, as described above, the transport path T including the introduction path R1, the descending path R2, and the ascending path R3 is formed.

The descending path R2 is a path through which the paper P is transported downward in the +Z direction.

The ascending path R3 is disposed downstream of the descending path R2 in the transport direction of the paper P. In addition, the ascending path R3 is a path through which the paper P is transported upward in the Z direction.

The descending path R2 and the ascending path R3 are formed by an upper guide portion 42 and a lower guide portion 62 to be described later. The descending path R2 and the ascending path R3 included in the transport path T overlap each other in a range ZA in the Z direction.

As an example, the upper guide portion 42 is attached to the cover portion 31 to be provided to be movable outward with respect to the device main body 12 together with the cover portion 31. In addition, the upper guide portion 42 is positioned above the descending path R2 and the ascending path R3 in the Z direction in a state in which it is stored in the device main body 12.

Specifically, the upper guide portion 42 is provided at an end portion of the cover portion 31 in the −Z direction. In addition, the upper guide portion 42 forms the ascending path R3 together with a second path forming member 82 to be described later and forms the descending path R2 together with a first path forming member 64 to be described later, in a closed state in which the cover portion 31 closes the opening 12A, that is, the cover portion 31 closes the transport path T. Note that in the present embodiment, the upper guide portion 42 refers to a portion forming the descending path R2 and the ascending path R3 among members provided on the cover portion 31.

When viewed from the Y direction, an area sandwiched between a virtual line K1 that passes through an end portion of the upper guide portion 42 in the +Z direction and follows the X direction and a virtual line K2 passing through an end portion of the upper guide portion 42 in the −Z direction and follows the X direction is referred to as a moving area S of the upper guide portion 42.

The moving area S is an area in which the upper guide portion 42 moves when the cover portion 31 is opened/closed. In FIG. 4, the moving area S is illustrated as a hatched area.

Further, the upper guide portion 42 is provided with a guide member 44, a second transport roller 52, an opposing roller 54, and a contacted portion 56 (FIG. 3) as an example.

The guide member 44 includes a bottom wall 46 positioned at a lower end in the −Z direction. The bottom wall 46 includes a concave portion 47 facing a first path forming member 64 to be described later in the Z direction and a convex portion 48 positioned downstream of the concave portion 47 in the transport direction of the paper P.

The concave portion 47 is a portion recessed in the +Z direction. In addition, the concave portion 47 has a slope 47A extending toward a position in the +X direction and the +Z direction and a slope 47B extending toward a position in the +X direction and the −Z direction downstream of the slope 47A. The slope 47B faces an upper wall 64A to be described later in the Z direction.

The convex portion 48 is a portion protruding in the −Z direction. The top of the convex portion 48 faces a first transport roller 68 to be described later in the Z direction.

Here, the guide member 44 and the lower guide portion 62 are disposed to face each other with a predetermined interval d therebetween, thereby forming the descending path R2.

The second transport roller 52 is provided on the top of the convex portion 48 as an example. The second transport roller 52 has a rotation shaft 53 extending along the Y direction. The rotation shaft 53 is rotatably supported by a bearing (not illustrated) provided in the guide member 44. The second transport roller 52 nips the paper P together with a first transport roller 68 to be described later, and transports the paper P while rotating.

When the cover portion 31 is in a closed state, the first transport roller 68 and the second transport roller 52 form a nip portion N1 nipping the paper P. When the cover portion 31 is in an opened state, the formation of the nip portion N1 is released.

The opposing roller 54 is provided at a position in the +X direction with respect to the most recessed portion of the concave portion 47, as an example. The opposing roller 54 has a rotation shaft 55 extending along the Y direction. The rotation shaft 55 is rotatably supported by a bearing (not illustrated) provided in the guide member 44. The opposing roller 54 faces a support roller 72 to be described later in the Z direction, nips the paper P together with the support roller 72, and rotates to transport the paper P.

When a first path forming member 64 to be described later is disposed at a first position, the support roller 72 and the opposing roller 54 are brought into a nip state, such that a nip portion N2 is formed. When the cover portion 31 is brought into the opened state and the first path forming member 64 is disposed at a second position, the nip state between the support roller 72 and the opposing roller 54 is released.

As illustrated in FIG. 3, the contacted portion 56 is provided at an end portion of the guide member 44 in the +Y direction. Note that the contacted portion 56 is included in the cover portion 31.

The contacted portion 56 has a contacted surface 57 along the Y-Z plane, as an example.

The contacted surface 57 comes into contact with a contact portion 78C (FIG. 6) to be described later in the X direction during a closing operation and in the closed state in which the cover portion 31 is closed. The contacted surface 57 comes into contact with the contact portion 78C, such that a pressing force in the +X direction is applied from the cover portion 31 to a lever portion 78 (FIG. 6) to be described later via the contacted surface 57 and the contact portion 78C. As a result, the lever portion 78 is rotated, such that the first path forming member 64 (FIG. 2) is disposed at the first position.

As illustrated in FIG. 4, the lower guide portion 62 is provided in the device main body 12, is positioned below the upper guide portion 42 in the Z direction, and forms the descending path R2 and the ascending path R3 together with the upper guide portion 42. In addition, the lower guide portion 62 includes the first path forming member 64 forming the descending path R2, a moving portion 76 (FIG. 6) moving the first path forming member 64, and the second path forming member 82 disposed downstream of the first path forming member 64 in the transport direction of the paper P and forming the ascending path R3, as an example. The movement here is not limited to a configuration in which the moving portion 76 moves the first path forming member 64 by applying a force to the first path forming member 64, and also includes a configuration in which the first path forming member 64 is moved by releasing the support of the first path forming member 64 or a configuration in which the first path forming member 64 moves while being supported.

The first path forming member 64 is provided to be movable to a first position, which is a position when the first path forming member 64 is in an inclined state in which it intersects the X direction, and a second position, which is a position when the first path forming member 64 is in a state in which it follows the X direction, when viewed from the Y direction. The first path forming member 64 forms the descending path R2 and partially overlaps the moving area S of the upper guide portion 42 in the Z direction at the first position, and does not overlap the moving area S in the Z direction at the second position. In other words, the first path forming member 64 is separated from the moving area S at the second position.

The first path forming member 64 is provided with a shaft portion 66 supporting the first path forming member 64 so as to be rotatable to one of the first position and the second position, as an example.

The shaft portion 66 is positioned below a coupling position between the descending path R2 and the ascending path R3 in the Z direction and below the moving area S. The second transport roller 52 is positioned in the +Z direction with respect to the shaft portion 66.

A part of the first path forming member 64 in the −X direction with respect to a central portion of the first path forming member 64 is positioned within the moving area S of the upper guide portion 42 in the closed state of the cover portion 31, that is, at the first position.

As illustrated in FIG. 5, the shaft portion 66 is formed in a columnar shape extending along the Y direction. Both end portions of the shaft portion 66 in the Y direction are rotatably supported by bearings 67 provided in the frame (not illustrated) of the device main body 12 (FIG. 1). A first transport roller 68 is provided at a central portion of the shaft portion 66 in the Y direction.

The first transport roller 68 is rotated in accordance with the rotation of the shaft portion 66. In addition, the first transport roller 68 can transport the paper P. In the present embodiment, as an example, two first transport rollers 68 are provided with an interval therebetween in the Y direction.

The first path forming member 64 includes an upper wall 64A, a front wall 64B, a rear wall 64C (FIG. 8), two side walls 64D, and two arm portions 64E. Note that here, a disposition of each component will be described assuming that the first path forming member 64 is disposed at the second position, that is, the first path forming member 64 follows the X direction.

The upper wall 64A is formed in a rectangular plate shape having a predetermined thickness in the Z direction. A width of the upper wall 64A in the Y direction is larger than the width of the paper P in the Y direction.

The front wall 64B extends from an end portion of the upper wall 64A in the −X direction in the −Z direction. Note that a coupling portion between the upper wall 64A and the front wall 64B is an R surface.

The rear wall 64C extends from an end portion of the upper wall 64A in the +X direction in the −Z direction.

The two side walls 64D extend from both end portions of the upper wall 64A in the Y direction in the −Z direction.

Storage portions 69 recessed from an upper surface 65 of the upper wall 64A in the −Z direction are formed at a portion of the upper wall 64A in the −X direction with respect to the center of the upper wall 64A in the X direction. The storage portions 69 are provided so that the support rollers 72 can rotate with the Y direction as an axial direction.

The support rollers 72 are formed in a columnar shape. A part of an outer peripheral surface 72A of the support roller 72 protrudes from the upper surface 65 in the +Z direction. The support roller 72 is pressed in the +Z direction by a spring (not illustrated). The support rollers 72 transport the paper P downstream while supporting the transported paper P.

The arm portions 64E extend from both end portions of the side wall 64D in the +X direction in the +X direction. In addition, the arm portions 64E are in contact with an outer peripheral surface of the shaft portion 66 and are slidable. In other words, the first path forming member 64 is rotatable, that is, swingable around the shaft portion 66.

Figure 8:
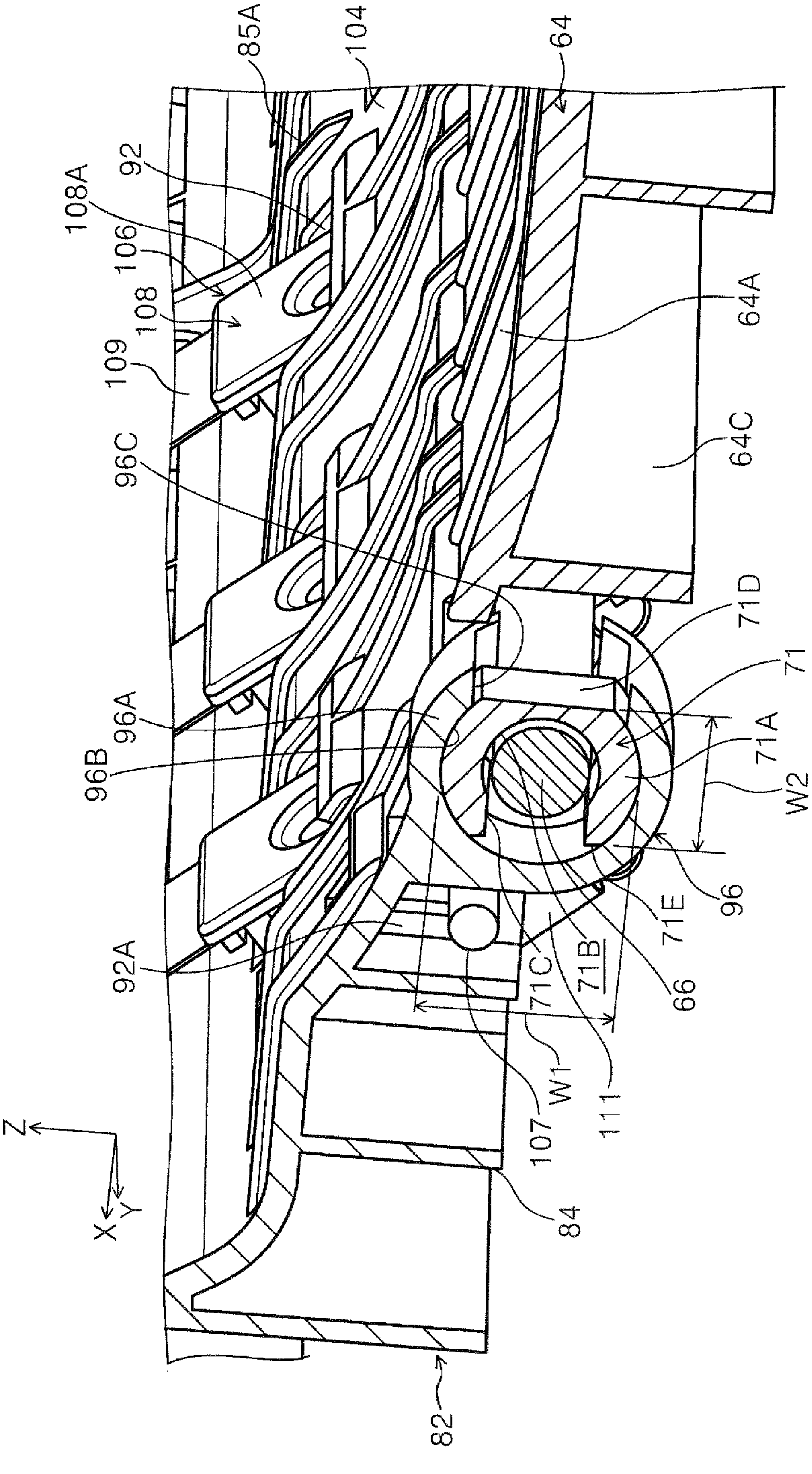
FIG. 8 is an enlarged perspective view of a coupling portion between a first lower guide member and a second lower guide member in the transport portion according to the embodiment.
Figure 9:
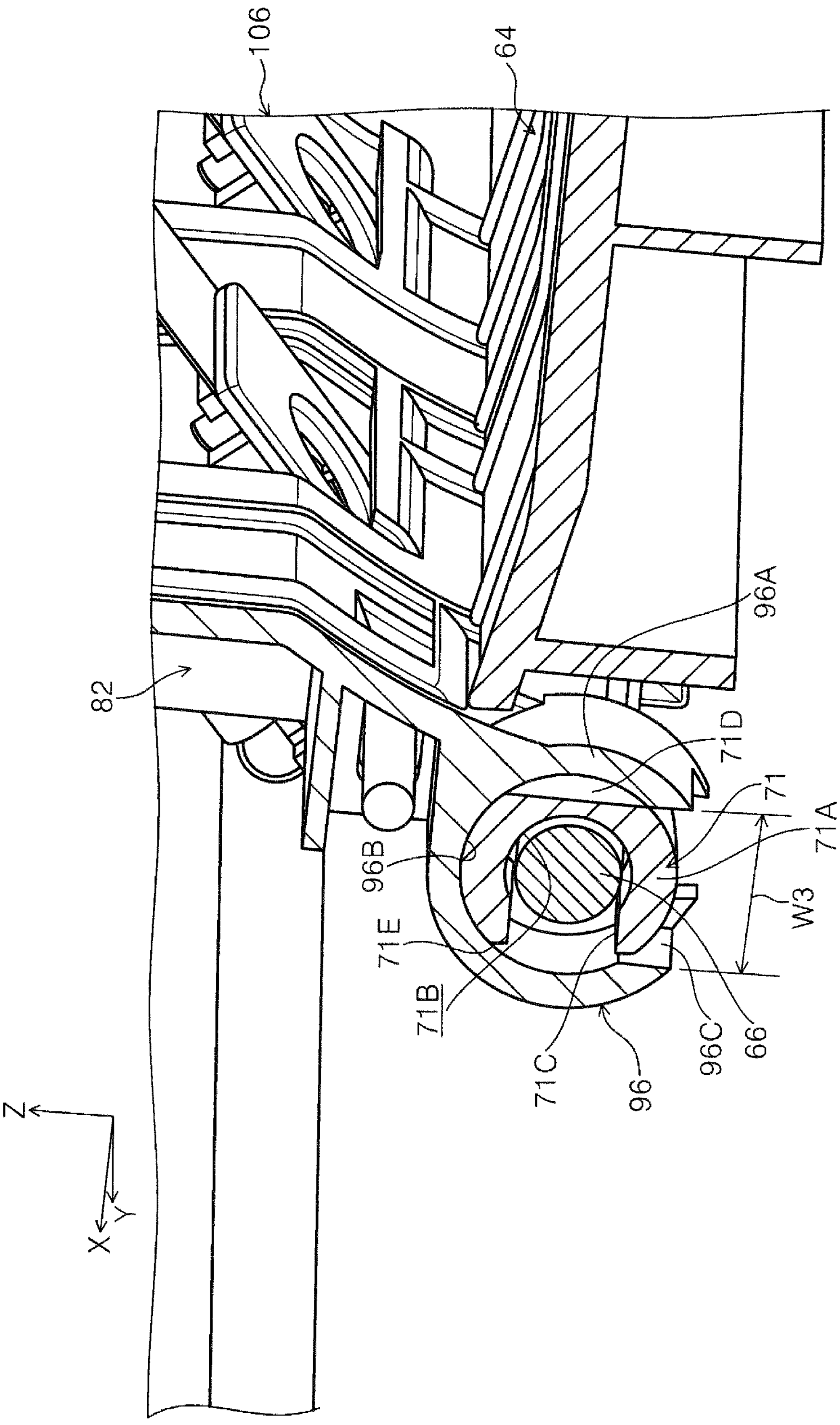
FIG. 9 is an enlarged perspective view of the coupling portion between the first lower guide member and the second lower guide member in the transport portion according to the embodiment.
Figure 10:
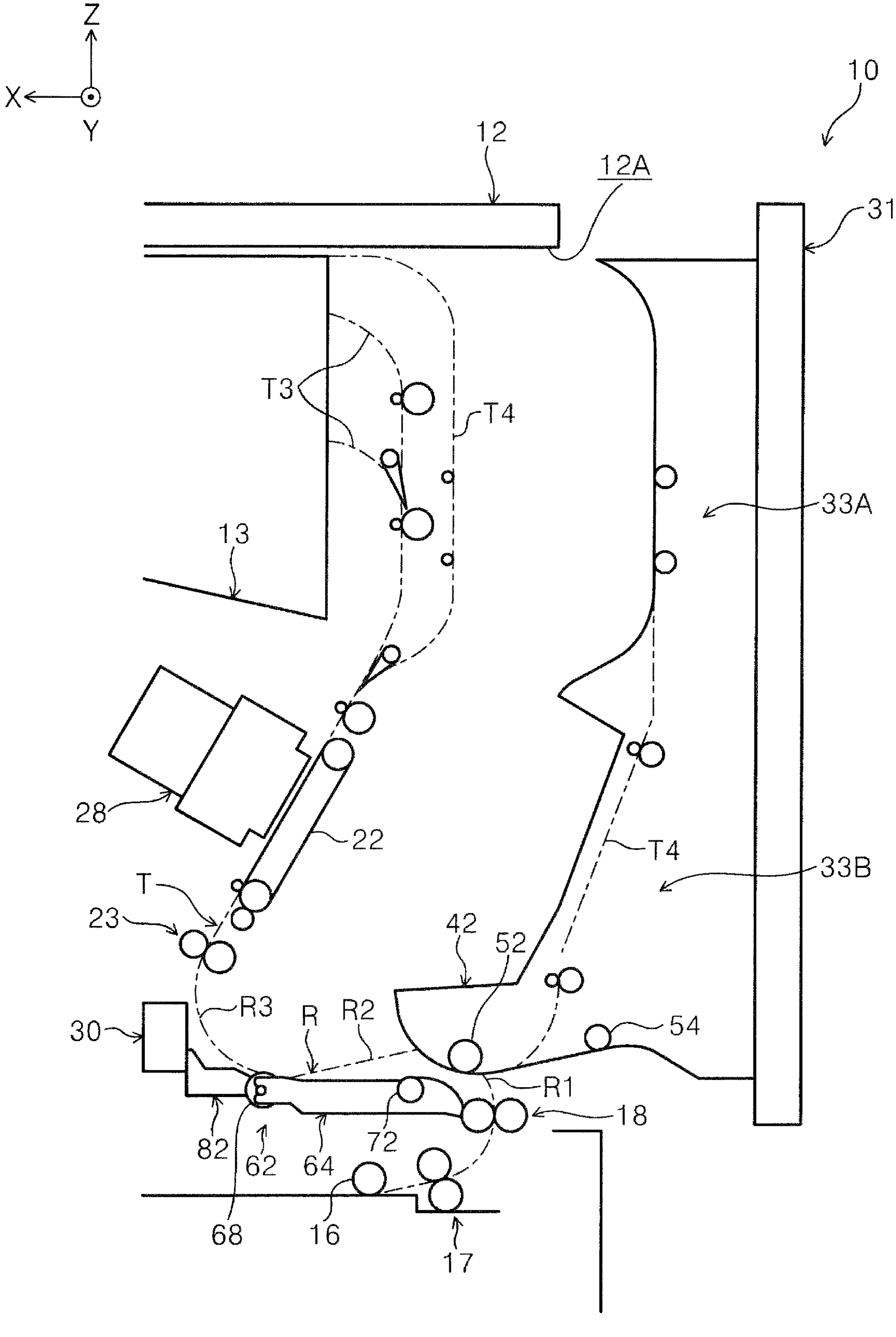
FIG. 10 is a schematic view illustrating a state in which the transport path is opened by opening a cover portion of the printer according to the embodiment.

As illustrated in FIGS. 5, 8 and 9, the arm portion 64E is provided with an engaged portion 71 engaged with an engaging portion 96 (FIG. 8) of a second path forming member 82 to be described later.

The engaged portion 71 protrudes from an inner portion of the arm portion 64E in the Y direction toward the center in the Y direction. As an example, the engaged portion 71 is formed in a C shape that opens in the +X direction in cross section when viewed from the Y direction in a state in which the first path forming member 64 is disposed at the first position. Specifically, the engaged portion 71 includes a main body portion 71A, a hole portion 71B, a notch portion 71C, and cut surfaces 71D and 71E.

The main body portion 71A is formed in a C-shaped plate shape having a predetermined thickness in the Y direction. The main body portion 71A is formed to have a circular outer shape except for the notch portion 71C and the cut surfaces 71D and 71E, when viewed from the Y direction. The hole portion 71B is a circular hole penetrating through the main body portion 71A in the Y direction. The notch portion 71C is formed by removing a part of the main body portion 71A in a circumferential direction, and communicates with the hole portion 71B.

When viewed from the Y direction, the cut surface 71D is positioned on an opposite side to the notch portion 71C with respect to the center of the main body portion 71A. In addition, the cut surface 71D is a surface along a direction orthogonal to a radial direction of the hole portion 71B. Note that an opening direction of the notch portion 71C is aligned with a normal direction of the cut surface 71D, as an example.

When viewed from the Y direction, a width corresponding to a diameter of an outer circumference of a circular portion of the main body portion 71A is W1. When viewed from the Y direction, the cut surface 71E is positioned at an end portion of the notch portion 71C in the −X direction. In addition, the cut surface 71E is a surface along the direction orthogonal to the radial direction of the hole portion 71B, and is disposed substantially parallel to the cut surface 71D as an example. A width in the X direction corresponding to a distance between the cut surface 71D and the cut surface 71E is W2.

Here, the arm portion 64E and the engaged portion 71 are coupled to the shaft portion 66 so as to be relatively rotatable around a central axis of the shaft portion 66 by inserting the shaft portion 66 into the hole portion 71B.

In FIGS. 8 and 9, a gap is illustrated between the shaft portion 66 and the hole portion 71B, but the outer peripheral surface of the shaft portion 66 and a wall surface of the hole portion 71B are into contact with each other at a position shifted in the Y direction.

In a state in which the first path forming member 64 is positioned at the first position, the notch portion 71C is opened in a direction including an X direction component. The cut surface 71D is positioned along the Y-Z plane.

The engaged portion 71 can pass through an opening 96C to be described later when a second path forming member 82 to be described later is in a retract position (FIG. 9). In addition, the engaged portion 71 cannot pass through the opening 96C when the second path forming member 82 is in a facing position (FIG. 8). As described above, the engaged portion 71 has an anisotropic shape in which it can or cannot pass through the opening 96C depending on a disposition direction.

Figure 6:
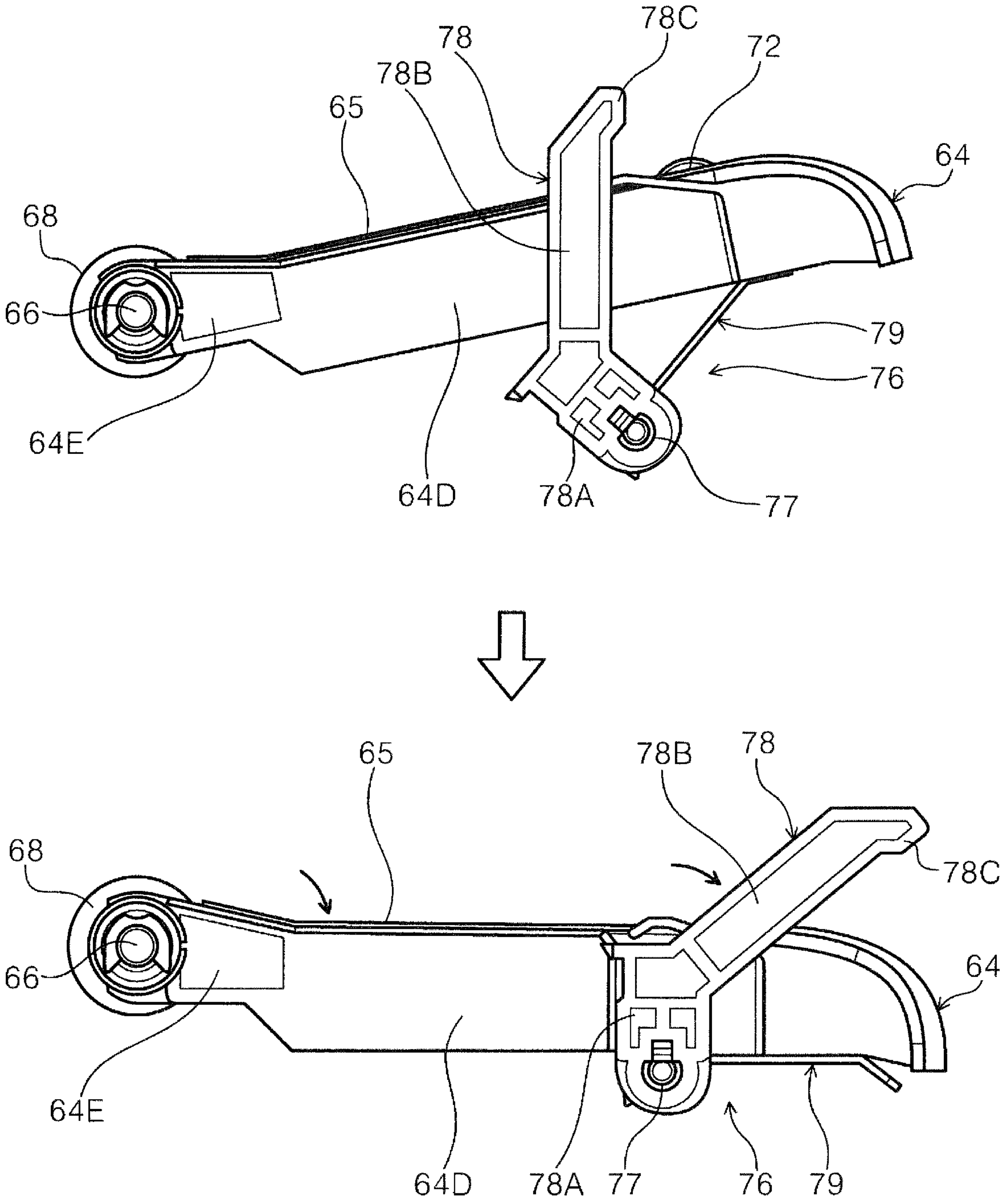
FIG. 6 is a side view illustrating a state in which a first lower guide member moves from a first position to a second position in accordance with rotation of a lever member of the transport portion according to the embodiment.

As illustrated in FIG. 6, the moving portion 76 moves the first path forming member 64 to one of the first position and the second position described above according to an opening/closing operation of the cover portion 31 (FIG. 2). Specifically, the moving portion 76 moves the first path forming member 64 to the second position when the cover portion 31 is opened, and moves the first path forming member 64 to the first position when the cover portion 31 is closed. Note that in the present embodiment, the moving portion 76 also functions as a holding portion holding the first path forming member 64 at the first position.

The moving portion 76 includes a rotation shaft 77, the lever portion 78, and a support portion 79, as an example.

The rotation shaft 77 is positioned in the −Z direction with respect to the first path forming member 64. In addition, the rotation shaft 77 is formed in a columnar shape extending along the Y direction. Both end portions of the rotation shaft 77 in the Y direction are rotatably supported by the frame (not illustrated) of the device main body 12.

The lever portion 78 is fixed to an end portion of the rotation shaft 77 in the +Y direction. In addition, the lever portion 78 is disposed in the +Y direction with respect to the side wall 64D in the +Y direction. The lever portion 78 comes into contact with the contacted surface 57 (FIG. 3) of the cover portion 31 to rotate the rotation shaft 77 in conjunction with the opening/closing operation of the cover portion 31. The lever portion 78 includes an attaching portion 78A extending in a radial direction from the rotation shaft 77, an extending portion 78B extending from an end portion of the attaching portion 78A in a direction intersecting the radial direction, and the contact portion 78C formed at a tip of the extending portion 78B.

The support portion 79 is fixed to the rotation shaft 77 at a position different from a position of the attaching portion 78A, as an example. In addition, the support portion 79 supports the first path forming member 64 at the first position.

The lever portion 78 is in contact with the cover portion 31 when the cover portion 31 is in the closed state, and is separated from the cover portion 31 when the cover portion 31 is in the opened state. Specifically, when the cover portion 31 is in the closed state, the contact portion 78C is in contact with the contacted surface 57. In a state in which the lever portion 78 is in contact with the cover portion 31, the support portion 79 supports the first path forming member 64.

As illustrated in FIG. 5, the second path forming member 82 is positioned in the +X direction with respect to the first path forming member 64. The second path forming member 82 is a long member long in the Y direction. The second path forming member 82 is attached to the medium width sensor 30 in a state in which it is positioned at a facing position to be described later. Specifically, the second path forming member 82 is attached to the side wall 38 using three screws 83, as an example.

The second path forming member 82 is mounted to be rotatable around the shaft portion 66 at the first path forming member 64. The second path forming member 82 is movable to the facing position, which is a position where it faces the upper guide portion 42 (FIG. 4) in the Z direction, and the retract position above the facing position in the Z direction in a state in which it is mounted at the first path forming member 64.

When the upper guide portion 42 is positioned outside the device main body 12 (FIG. 2), in other words, when the cover portion 31 is in the opened position, the second path forming member 82 becomes attachable to and detachable from the first path forming member 64 at a retract position to be described later.

Figure 7:
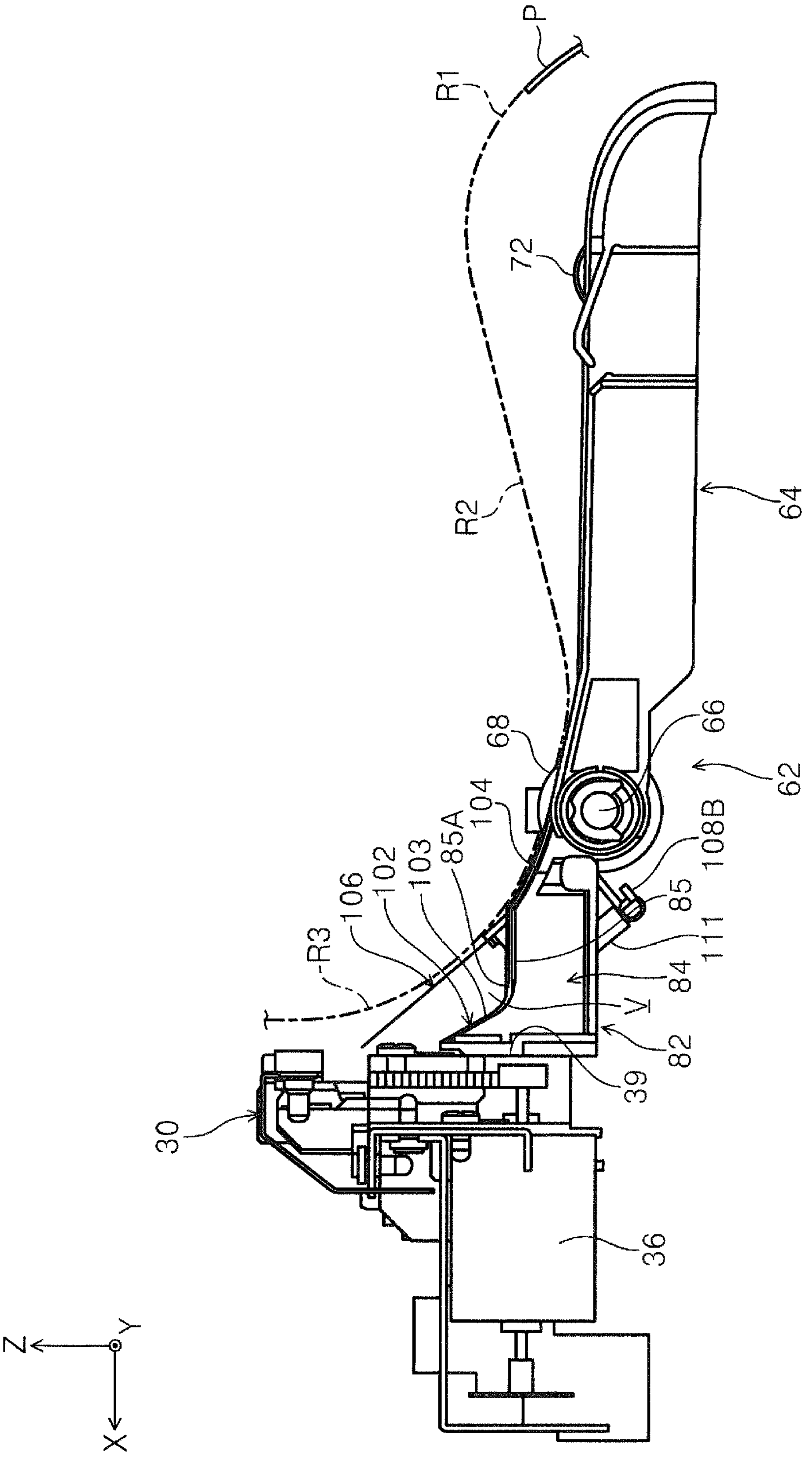
FIG. 7 is a side view of the first path forming member, the second path forming member, and the paper width sensor of the transport portion according to the embodiment when viewed from a width direction.

As illustrated in FIG. 7, the second path forming member 82 includes a base portion 84, a widened portion 102, a guide surface 104, and a guide portion 106, as an example.

As illustrated in FIG. 5, the base portion 84 includes an upper wall 85, side walls 86, vertical walls 88, recessed portions 92, a roller storage portion 94, and the engaging portion 96 (FIG. 8), as an example.

The upper wall 85 constitutes an end portion of the base portion 84 in the +Z direction. In addition, the upper wall 85 is provided with a widened portion 102 and a guide portion 106 to be described later. A part of the upper wall 85 in the +Z direction has an upper surface 85A along an X-Y plane.

The side walls 86 extend from both end portions of the upper wall 85 in the Y direction in the −Z direction.

The vertical walls 88 extend from end portions of the side walls 86 in the +X direction outward in the Y direction. In addition, the vertical walls 88 are in contact with the side wall 38 of the medium width sensor 30 and are attached to the side wall 38 by the screws 83, in a disposed state along the Y-Z plane.

The recessed portions 92 are portions disposed in the upper wall 85 at intervals in the Y direction and recessed from the upper wall 85 in the −Z direction.

The roller storage portion 94 is a portion in which a central portion of the base portion 84 in the Y direction at an end portion of the base portion 84 in the −X direction is recessed in the +X direction. In addition, the roller storage portion 94 rotatably stores a part of the first transport roller 68.

As illustrated in FIGS. 8 and 9, the engaging portion 96 engages with the engaged portion 71 of the first path forming member 64. In other words, the second path forming member 82 is provided to be attachable to and detachable from a portion of the first path forming member 64 to which the shaft portion 66 is attached.

The engaging portions 96 are provided at both end portions of the base portion 84 in the Y direction at an end portion of the base portion 84 in the −X direction, as an example. The engaging portion 96 protrudes from the base portion 84 in the −X direction. The engaging portion 96 is formed in a C shape that opens in the −X direction in cross section when viewed from the Y direction in a state in which the second path forming member 82 is in the facing position. Specifically, the engaging portion 96 has a main body portion 96A, a hole portion 96B, and an opening 96C.

The main body portion 96A is formed in a cylindrical shape with the Y direction as an axial direction, except for the opening 96C. The hole portion 96B is a circular hole penetrating through the main body portion 96A in the Y direction.

The opening 96C is formed by a part of a peripheral wall of the main body portion 96A being removed, and communicates with the hole portion 96B. In addition, the opening 96C opens in a radial direction of the shaft portion 66. A width of the opening 96C when viewed from an extension direction of the shaft portion 66 is W3 (FIG. 9). The width W3 is smaller than the width W1 and larger than the width W2.

The engaging portion 96 can be detached from the main body portion 71A in the +Z direction in a disposition state in which an arc portion of the main body portion 71A in the −Z direction and the opening 96C are arranged in the Z direction. In other words, when the cut surface 71D and the cut surface 71E of the main body portion 71A are in positions along a detaching direction of the main body portion 96A, the main body portion 96A can be detached from the main body portion 71A. Further, in other words, when a virtual line (not illustrated) coupling the cut surface 71D and the cut surface 71E of the main body portion 71A to each other is orthogonal to the detaching direction of the main body portion 96A, the main body portion 96A can be detached from the main body portion 71A. The disposition state (FIG. 9) in which the arc portion of the main body portion 71A in the −Z direction and the opening 96C are arranged in the Z direction is a case where the second path forming member 82 is in the retract position.

In addition, the engaging portion 96 is restricted from being detached from the main body portion 71A in the +Z direction in a disposition state (FIG. 8) in which the arc portion of the main body portion 71A in the −Z direction and the opening 96C are not arranged in the Z direction. The disposition state in which the arc portion of the main body portion 71A in the −Z direction and the opening 96C are not arranged in the Z direction is a case where the second path forming member 82 is in the facing position.

As illustrated in FIG. 7, the widened portion 102 is a portion provided at an end portion of the upper wall 85 in the +X direction and protruding from the upper surface 85A in the +Z direction. The widened portion 102 is formed in a right-angled triangular shape of which a hypotenuse is positioned in the −X direction when viewed from the +Y direction. That is, the widened portion 102 has a slope 103.

The slope 103 extends in the Y direction. In addition, the slope 103 is inclined so as to extend obliquely upward from an end of the upper surface 85A in the +X direction toward a position in the +X direction and the +Z direction.

As a result, the widened portion 102 expands a space of the ascending path R3 in the +X direction as an example of an intersection direction intersecting both the Y direction and the transport direction of the paper P.

Other members are not disposed in a space portion V surrounded by the upper surface 85A and the slope 103 and the ascending path R3 when a guide portion 106 to be described later is stored in the recessed portion 92 (FIG. 5). For this reason, the space portion V can be used to deflect the paper P. Note that when the paper P is deflected, the paper P needs to be continuously transported by the first transport roller 68 and the second transport roller 52 (FIG. 2) in a state in which the rotation of the skew roller pair 23 (FIG. 1) is stopped and a front end of the paper P is pressed against the skew roller pair 23.

The guide surface 104 is formed in the −X direction with respect to the upper surface 85A. The guide surface 104 is formed in an arc shape when viewed from the Y direction, and forms a part of the ascending path R3.

As illustrated in FIG. 8, the recessed portion 92 straddles an end portion of the upper surface 85A in the −X direction and an end portion of the guide surface 104 in the +X direction, as an example.

The guide portion 106 has a rotation shaft 107, movable portions 108, sheet members 109, and a tension spring 111, as an example. The guide portion 106 can be displaced to a protrusion position where it protrudes toward the ascending path R3 and a storage position where it is stored in the recessed portion 92. The guide portion 106 guides the paper P obliquely upward along the ascending path R3.

The rotation shaft 107 is a columnar member penetrating through a plurality of recessed portions 92 in the Y direction. Both end portions of the rotation shaft 107 in the Y direction are supported by side walls 92A of some of the recessed portions 92.

The movable portion 108 includes a plate portion 108A having a predetermined thickness and having a rectangular shape and a hook portion 108B (FIG. 7) protruding from an end portion of the plate portion 108A in the −Z direction in the −Z direction. A part of the plate portion 108A is attached to the rotation shaft 107.

The sheet member 109 is formed in a rectangular shape long in the transport direction of the paper P. In addition, the sheet member 109 has flexibility. As the sheet member 109, for example, a resin film member such as Lumirror (registered trademark) can be used. An end portion of the sheet member 109 in the −Z direction is attached to an end portion of the plate portion 108A in the +Z direction.

One end of the tension spring 111 is hooked on a claw portion (not illustrated) of the second path forming member 82, and the other end of the tension spring 111 is hooked on the hook portion 108B (FIG. 7). As a result, the tension spring 111 applies an elastic force to the movable portion 108 in a direction in which a part of the movable portion 108 protrudes from the upper surface 85A and the guide surface 104 in the +Z direction.

Next, actions of the transport portion 40 and the printer 10 will be described.

As illustrated in FIG. 2, the cover portion 31 closes the opening 12A in the closed state by the cover portion 31. The first path forming member 64 is positioned at the first position. The second path forming member 82 is positioned at the facing position. It is assumed that the cover portion 31 is opened in this closed state.

As illustrated in FIGS. 3, 4, 6 and 10, the contacted portion 56 is separated from the lever portion 78 in accordance with the movement of the cover portion 31 in the −X direction. As a result, the lever portion 78 becomes freely rotatable, and a support force of the support portion 79 supporting the first path forming member 64 is weakened.

Here, a portion of the first path forming member 64 in the −X direction descends by an action of its own weight, such that the support portion 79 rotates and the lever portion 78 also rotates.

The first path forming member 64 is positioned at the second position along the X direction. In other words, the first path forming member 64 retracts in the −Z direction with respect to the moving area S of the upper guide portion 42.

The first path forming member 64 retracts in the −Z direction, such that there is no member restricting the movement of the upper guide portion 42 in the moving area S of the upper guide portion 42. As a result, the cover portion 31 can be opened to a position where the opening 12A and the transport path T are opened.

Figure 11:
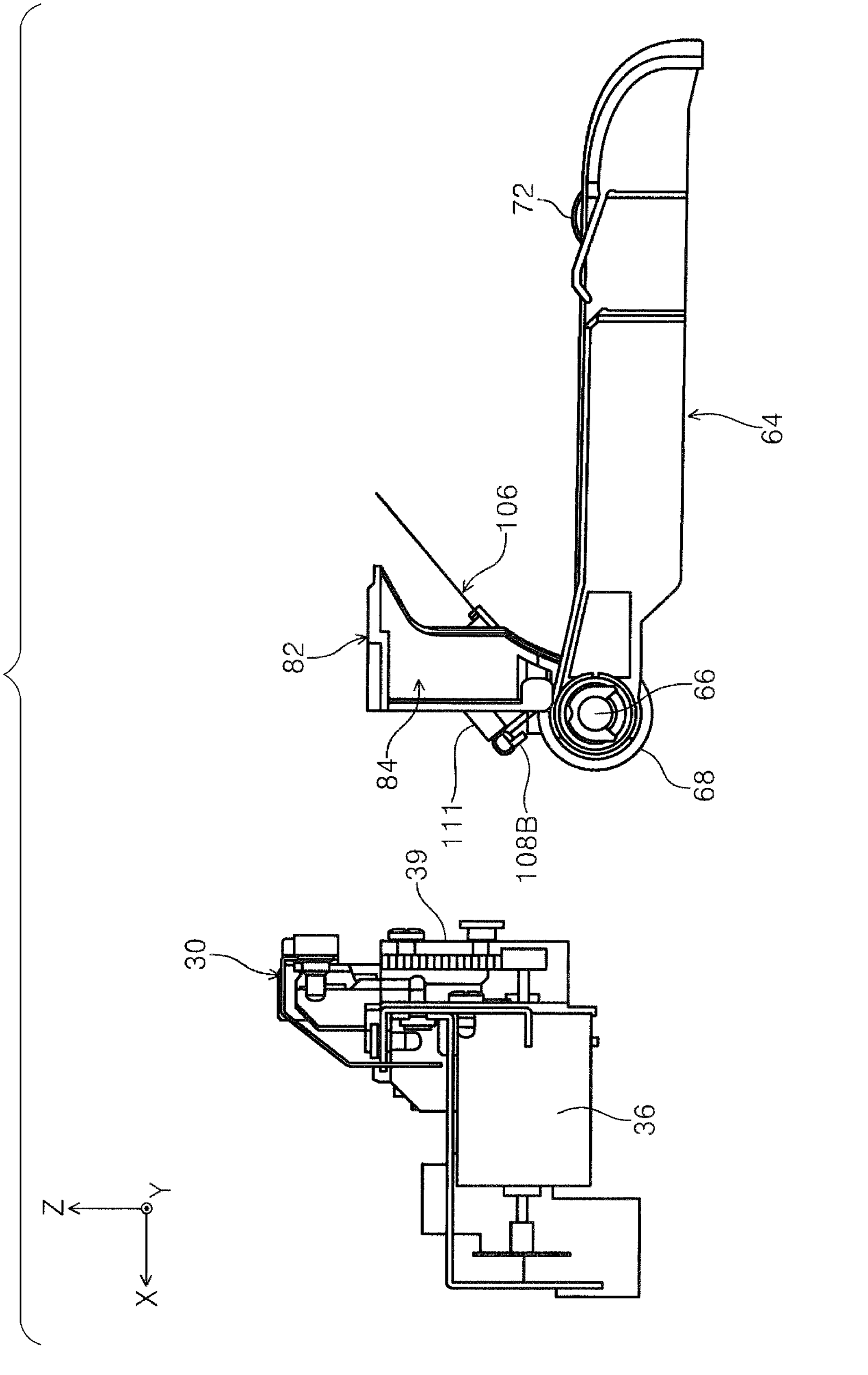
FIG. 11 is a side view illustrating a state in which the second lower guide member is rotated in the transport portion according to the embodiment.

As illustrated in FIGS. 5, 9, and 11, the screws 83 are removed in the opened state. Then, the second path forming member 82 is rotated in a direction in which the base portion 84 stands up along the Z direction.

Here, in a state where the base portion 84 stands up in the Z direction, the arc portion of the main body portion 71A in the −Z direction and the opening 96C are arranged in the Z direction, and thus, the engaging portion 96 can be detached in the +Z direction. That is, the second path forming member 82 can be detached in the +Z direction. Note that when the second path forming member 82 is attached, the reverse procedure is executed.

As illustrated in FIGS. 2, 4 and 6, when the cover portion 31 is closed from a state in which the transport path T is opened, the lever portion 78 comes into contact with the contacted portion 56, such that the lever portion 78 is rotated in a reverse direction. Then, the support portion 79 is also rotated in the reverse direction in accordance with the rotation of the lever portion 78 in the reverse direction, such that the first path forming member 64 is rotated in the reverse direction and is positioned at the first position. At this time, the nip portion N1 and the nip portion N2 are formed.

In this way, the cover portion 31 closes the transport path T and the opening 12A.

As described above, according to the transport portion 40, by having the ascending path R3 and the descending path R2, it is possible to make a path length of the transport path T larger than that of a configuration having a linear transport path T.

In addition, the first path forming member 64 is moved to the second position, such that the upper guide portion 42 can be moved outward with respect to the device main body 12 and the transport path T is opened, and thus, it is possible to facilitate maintenance of the second path forming member 82.

Further, when the upper guide portion 42 is moved outward with respect to the device main body 12, only the first path forming member 64 needs to be retracted in the lower guide portion 62, and thus, it is possible to minimize a space for the lower guide portion 62 to retract.

According to the transport portion 40, the first path forming member 64 is rotated around the shaft portion 66 to be moved to one of the first position and the second position, and thus, it is possible to move the first path forming member 64 with a simple configuration. In addition, the shaft portion 66 is positioned below the moving area S of the upper guide portion 42, and thus, it is possible to prevent the shaft portion 66 from coming into contact with the upper guide portion 42.

According to the transport portion 40, the second path forming member 82 can be attached and detached without detaching the first path forming member 64, and thus, it is possible to facilitate a work of replacement or maintenance of the second path forming member 82. In addition, the second path forming member 82 is attached to and detached from the first path forming member 64, and thus, it becomes easy to secure position accuracy of the second path forming member 82 with respect to the first path forming member 64 as compared with a configuration in which the second path forming member 82 is attached to and detached from a portion different from the first path forming member 64.

According to the transport portion 40, the upper guide portion 42 retracts, such that an opened space can be used, and thus, it is possible to facilitate a work of attaching and detaching the second path forming member 82.

According to the transport portion 40, when the second path forming member 82 is in the facing position, the second path forming member 82 is not detached from the first path forming member 64. In other words, when the paper P is transported along the transport path T, a positional deviation of the second path forming member 82 with respect to the first path forming member 64 is suppressed, and thus, it is possible to stabilize a transport state of the paper P in the ascending path R3.

According to the transport portion 40, attachment and detachment and maintenance of the medium width sensor 30 become possible by detaching the second path forming member 82, and thus, it is possible to facilitate the attachment and detachment and the maintenance of the medium width sensor 30 as compared with a configuration in which maintenance of the medium width sensor 30 becomes possible by detaching all of the lower guide portions 62.

According to the transport portion 40, it is possible to secure position accuracy of the second path forming member 82 with respect to the medium width sensor 30.

According to the transport portion 40, when the paper P is transported in the ascending path R3, the guide portion 106 is disposed at the protrusion position, such that the ascending path R3 is formed.

Meanwhile, for example, when the paper P is deflected in the ascending path R3 in order to perform skew correction or the like of the paper P, the guide portion 106 is displaced to the storage position, such that a space of the ascending path R3 is expanded to the widened portion 102. As a result, a space for deflecting the paper P can be secured. As described above, the space of the ascending path R3 can be used properly depending on a purpose.

According to the printer 10, the action and effect of the transport portion 40 can be obtained.

The transport portion 40 and the printer 10 according to the embodiment of the present disclosure basically have the configurations as described above, but it is, of course, possible to change or omit partial configurations without departing from the scope of the present disclosure.

In the printer 10, all of the first path forming members 64 may be positioned in the moving area S. The descending path R2 and the ascending path R3 may be disposed reversely in the X direction, that is, a part of the transport path T may have a mountain shape in the +Z direction. The medium is not limited to the paper P, and may be a film. The recording portion is not limited to the line head 28, and may be a component having a serial head reciprocating in a width direction of the paper P. The device height direction may be a direction intersecting the vertical direction.

In the printer 10, the first transport roller 68 and the second transport roller 52 may not be provided. In addition, the support roller 72 and the opposing roller 54 may not be provided.

In the printer 10, the second path forming member 82 may be undetachable from the portion of the first path forming member 64 to which the shaft portion 66 is attached. In addition, the second path forming member 82 may be slidably mounted on the shaft portion 66.

In the engaging portion 96, the opening 96C may not be formed. For example, the engaging portion and the engaged portion may be configured to engage with each other in the Y direction on the shaft portion 66.

Instead of the medium width sensor 30, a paper sensor sensing the presence or absence of paper P may be provided.

The second path forming member 82 may be attached to a member different from the medium width sensor 30 in a state in which it is positioned at the facing position.

The second path forming member 82 may not have the widened portion 102. The guide portion 106 may be fixed by the second path forming member 82.

The device main body 12 of the printer 10 may not be also used as the device main body of the transport portion 40. That is, in the printer 10, the transport portion 40 may be configured as a unit separate from the device main body 12.

What is claimed is:

1. A transport device comprising:

a device main body provided with a transport path in which a descending path, through which a medium is transported downward in a device height direction, and an ascending path, through which the medium is transported upward in the device height direction, overlap in the device height direction;

an upper guide portion configured to be moved outward with respect to the device main body and positioned above the descending path and the ascending path in the device height direction in a state in which the upper guide portion is stored in the device main body; and a lower guide portion provided in the device main body, positioned below the upper guide portion in the device height direction, and forming the descending path and the ascending path together with the upper guide portion, wherein the upper guide portion forms an upper surface of the descending path, the lower guide portion forms a lower surface of the descending path, the lower guide portion includes a first path forming member forming the descending path and a second path forming member disposed downstream of the first path forming member in a transport direction of the medium and forming the ascending path, the first path forming member is configured to be moved to a first position and a second position, forms the descending path and at least partially overlaps a moving area of the upper guide portion in the device height direction at the first position, and does not overlap the moving area in the device height direction at the second position, and the lower guide portion is provided in the device main body so as to not be moveable outward with respect to the device main body.

2. The transport device according to claim 1, further comprising a shaft portion supporting the first path forming member so as to allow rotation of the first path forming member to one of the first position and the second position is provided, wherein the shaft portion is positioned below a coupling position between the descending path and the ascending path in the device height direction and below the moving area.

3. The transport device according to claim 2, wherein the second path forming member is configured to be attached to and detached from a portion of the first path forming member that is attached to the shaft.

4. The transport device according to claim 3, wherein the second path forming member is mounted at the first path forming member and configured to rotate around the shaft portion and is configured to be moved to a facing position where the second path forming member faces the upper guide portion and a retract position above the facing position in the device height direction in a state in which the second path forming member is mounted at the first path forming member, and when the upper guide portion is positioned outside the device main body, the second path forming member is configured to be attached to and detached from the first path forming member at the retract position.

5. The transport device according to claim 3, wherein the second path forming member is provided with an engaging portion engaging with the first path forming member, the first path forming member is provided with an engaged portion engaged with the engaging portion, the engaging portion has an opening that opens in a radial direction of the shaft portion, and the engaged portion has an anisotropic shape in which the engaged portion is configured to pass through the opening when the second path forming member is in the retract position and is configured not to pass through the opening when the second path forming member is in the facing position.

6. The transport device according to claim 1, wherein the device main body includes a sensor unit configured to detect the medium and to be attached to and detached from the device main body, and the sensor unit faces the ascending path downstream of the second path forming member in the transport direction and is configured to be detached from the device main body by the second path forming member being detached.

7. The transport device according to claim 6, wherein the second path forming member is attached to the sensor unit in a state in which the second path forming member is positioned at the facing position.

8. The transport device according to claim 1, wherein the second path forming member includes a widened portion expanding a space of the ascending path in an intersecting direction intersecting both of a width direction of the medium and the transport direction, and a guide portion guiding the medium along the ascending path, and the guide portion is configured to be displaced to a protrusion position where the guide portion protrudes toward the ascending path and a storage position where the guide portion is stored in the second path forming member.

9. A printing device comprising:

the transport device according to claim 1; and a recording portion performing recording on the medium transported by the transport device.

10. A transport device comprising:

a device main body provided with a transport path in which a descending path, through which a medium is transported downward in a device height direction, and an ascending path, through which the medium is transported upward in the device height direction, overlap in the device height direction;

an upper guide portion configured to be moved outward with respect to the device main body and positioned above the descending path and the ascending path in the device height direction in a state in which the upper guide portion is stored in the device main body; and a lower guide portion provided in the device main body, positioned below the upper guide portion in the device height direction, and forming the descending path and the ascending path together with the upper guide portion, wherein the upper guide portion forms an upper surface of the descending path, the lower guide portion forms a lower surface of the descending path, the lower guide portion includes a first path forming member forming the descending path and a second path forming member disposed downstream of the first path forming member in a transport direction of the medium and forming the ascending path, and the first path forming member is configured to be moved to a first position and a second position, forms the descending path and at least partially overlaps a moving area of the upper guide portion in the device height direction at the first position, and does not overlap the moving area in the device height direction at the second position, further comprising a shaft portion supporting the first path forming member so as to allow rotation of the first path forming member to one of the first position and the second position is provided, wherein the shaft portion is positioned below a coupling position between the descending path and the ascending path in the device height direction and below the moving area.

11. A transport device comprising:

a device main body provided with a transport path in which a descending path, through which a medium is transported downward in a device height direction, and an ascending path, through which the medium is transported upward in the device height direction, overlap in the device height direction;

an upper guide portion configured to be moved outward with respect to the device main body and positioned above the descending path and the ascending path in the device height direction in a state in which the upper guide portion is stored in the device main body;

a lower guide portion provided in the device main body, positioned below the upper guide portion in the device height direction, and forming the descending path and the ascending path together with the upper guide portion; and a cover portion which is movable between an opened position where the cover portion exposes the transport path and a closed position where the cover portion hides the transport path, wherein the upper guide portion is directly attached to the cover portion, the direct attachment causing the upper guide portion to be moved outward with respect to the device main body when the cover portion moves to the opened position, the upper guide portion forms an upper surface of the descending path, the lower guide portion forms a lower surface of the descending path, the lower guide portion includes a first path forming member forming the descending path and a second path forming member disposed downstream of the first path forming member in a transport direction of the medium and forming the ascending path, and the first path forming member is configured to be moved to a first position and a second position, forms the descending path and at least partially overlaps a moving area of the upper guide portion in the device height direction at the first position, and does not overlap the moving area in the device height direction at the second position.

* * * * *